United States Patent
Martone

[11] Patent Number: 6,059,241
[45] Date of Patent: May 9, 2000

[54] CLIP-TYPE FASTENING DEVICE WITH CLAMPING MEANS SECURABLE ABOUT A FIXED MEMBER

[76] Inventor: Michael A. Martone, 4793 Orchard Ridge, Troy, Mich. 48098

[21] Appl. No.: 09/130,010

[22] Filed: Aug. 6, 1998

Related U.S. Application Data

[63] Continuation of application No. 08/577,191, Dec. 22, 1995, Pat. No. 5,806,819.

[51] Int. Cl.⁷ .................................................. A47B 96/06
[52] U.S. Cl. .................................... 248/230.1; 248/230.8; 248/301; 24/16 PB
[58] Field of Search ................................ 248/58, 60, 61, 248/67.7, 69, 73, 74.1, 74.2, 74.3, 74.4, 219.4, 211.3, 316.5, 215, 214, 71, 62, 68.1, 230.1, 230.5, 230.8, 540, 541, 301; 24/20 EE, 20 TT, 484, 16 R, 16 PB, 17 PB; 138/106, 161

[56] References Cited

U.S. PATENT DOCUMENTS

| | | | |
|---|---|---|---|
| 1,015,717 | 1/1912 | Shimer | 248/541 |
| 1,535,396 | 4/1925 | Buehler | 248/541 |
| 2,516,989 | 8/1950 | Herndon . | |
| 2,721,050 | 10/1955 | Sams . | |
| 3,136,515 | 6/1964 | Potruch . | |
| 3,251,104 | 5/1966 | Sylvester . | |
| 3,289,982 | 12/1966 | Hart | 248/541 |
| 3,706,297 | 12/1972 | Voorhees . | |
| 3,820,500 | 6/1974 | Merryweather . | |
| 3,888,439 | 6/1975 | Tuttle . | |
| 4,372,011 | 2/1983 | Aranyos . | |
| 4,452,167 | 6/1984 | Burroughs . | |
| 4,700,655 | 10/1987 | Kirby . | |
| 4,730,800 | 3/1988 | Engman | 248/62 |
| 4,840,345 | 6/1989 | Neil et al. | 248/74.2 |
| 4,935,992 | 6/1990 | Due . | |
| 5,016,843 | 5/1991 | Ward | 248/68.1 |
| 5,024,405 | 6/1991 | McGuire . | |
| 5,148,576 | 9/1992 | Dyer . | |
| 5,226,623 | 7/1993 | Hunt et al. . | |
| 5,237,955 | 8/1993 | Jennings . | |
| 5,255,627 | 10/1993 | Williams . | |
| 5,309,604 | 5/1994 | Poulsen . | |
| 5,344,107 | 9/1994 | Lee . | |
| 5,423,501 | 6/1995 | Yu . | |
| 5,474,268 | 12/1995 | Yu . | |
| 5,495,821 | 3/1996 | Brewer | 116/174 |
| 5,590,859 | 1/1997 | Lord | 248/62 |
| 5,806,819 | 9/1998 | Martone . | |

Primary Examiner—Ramon O. Ramirez
Assistant Examiner—Gwendolyn Baxter
Attorney, Agent, or Firm—Gifford, Krass, Groh, Sprinkle, Anderson & Citkowski, P.C.

[57] ABSTRACT

A clip-type fastening device having a deformable and resilient body which is constructed of first and second deformable aperture defining portions which in combination define an aperture within the body. First and second engaging members are integrally formed with the deformable aperture defining portions and are inter-engageable to clamp the body around a fixed member in a step-lock fashion. The aperture defining portions and engaging members may be deformed and separated in a twisting manner to release the body from the fixed member and a deformable clip portion is likewise separable to releasably secure an object such as a length of cord or a flag grommet.

11 Claims, 2 Drawing Sheets

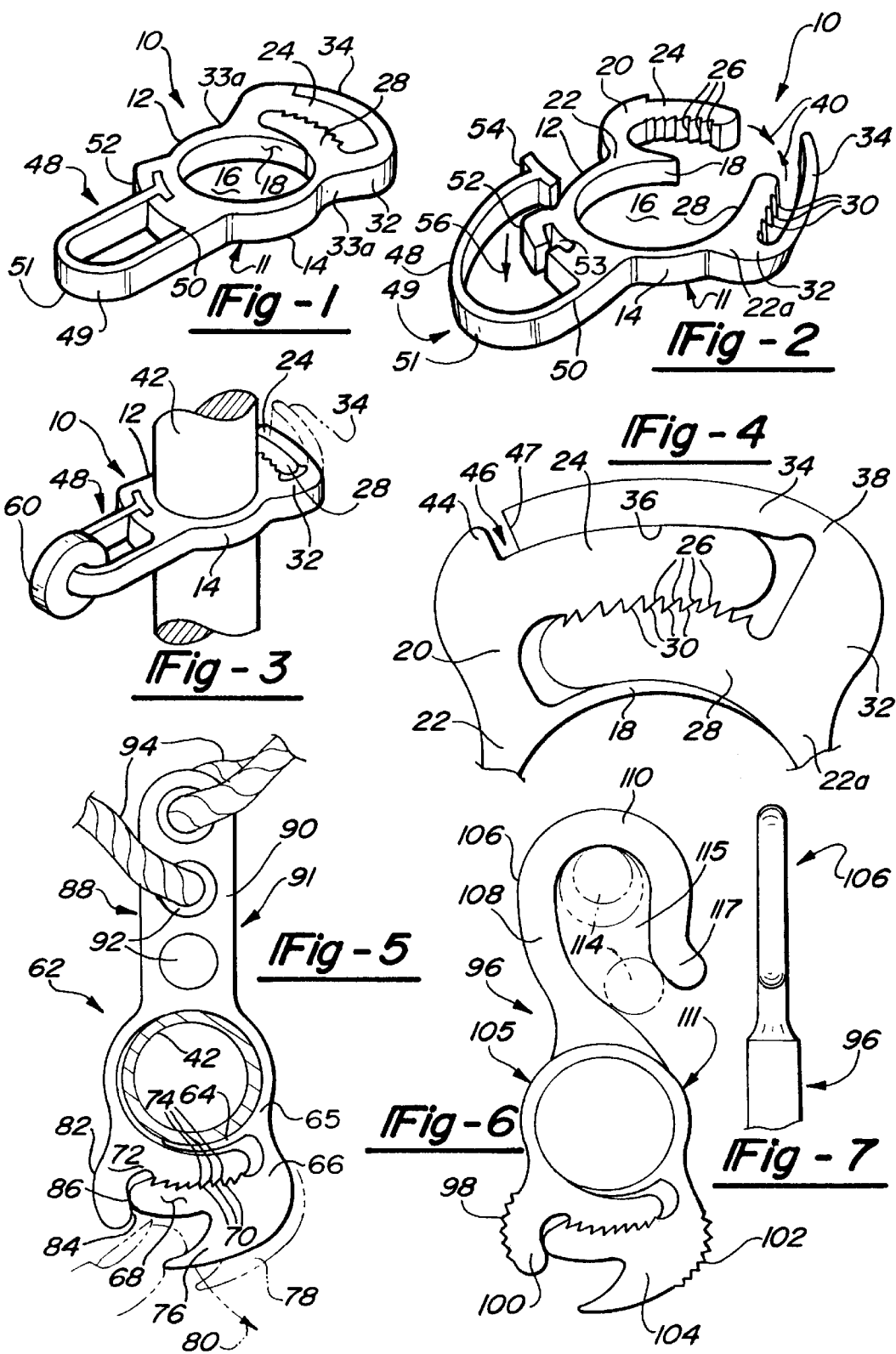

CLIP-TYPE FASTENING DEVICE WITH CLAMPING MEANS SECURABLE ABOUT A FIXED MEMBER

CROSS REFERENCE TO RELATED APPLICATIONS

The present application is a continuation of U.S. Ser. No. 08/577,191, filed Dec. 22, 1995, now U.S. Pat. No. 5,806,819.

BACKGROUND OF THE INVENTION

1. Field of the Invention

The present invention relates generally to a clip and related engaging devices and, more particularly, to a clip-type fastening device which includes clamping means securable about a fixed member for mounting the clip device in place.

2. Description of the Prior Art

Various kinds of clip devices are known in the art which are used for, among other things, securing objects attached by lengths of cord such as flag and flagpole lines. Other objects, such as those used on boats and other marine craft, often also require the use of some type of clip device assembly. It is often desirable for the device to include some form of clamping means in order to effectively mount the clip device in place prior to engaging the desired line or object.

U.S. Pat. No. 3,251,104, issued to Sylvester, teaches a clamping device having a clip portion and a pair of mating blocks which, when assembled together, define a pair of passages for receiving respectively a flagpole halyard and an attaching bar of the clip portion. One or two screws are provided to draw the mating block halves together and are rotatable within internally threaded apertures formed in the mating blocks. Grommet openings formed along an edge of a flag are received within a hook portion of the clip. The shortcoming of the device illustrated in the Sylvester patent is that its clamping means, which are created upon piecing the mating blocks together, are of a fixed diameter and are suited only for engaging around a halyard line or other member of similar diameter. The clamping means of the Sylvester device are not well suited for securing to other types of objects of differing diameters.

U.S. Pat. No. 3,706,297, issued to Voorhees, teaches a device for swivelly mounting a flag on a flagstaff and includes a plurality of one piece plastic members. Each member is constructed of a cylindrical bore for receiving the flagstaff and a smaller bore for receiving a halyard rod. A hook portion extends from each member and includes a spring clip portion for engaging a flag eyelet. The clamping means formed by the cylindrical bore in the Voorhees clamp is also of a fixed diameter and is only slidably affixed to the flagstaff.

SUMMARY OF THE PRESENT INVENTION

The present invention is a clip-type fastening device with clamping means for securing to a fixed member and including a body with first and second deformable aperture defining portions which in combination define a curved shaped aperture. The deformable portions are twist fitted around the fixed member, such as a pole or other tubular member, to position in place the fastening device. The clamping means further include first and second engaging members which are associated with their respective deformable portions and which, upon being press fit together, provide opposing serrated teeth which interengage to clamp together in a step lock fashion. The clamping means are adjustable to fixedly secure the body to members which have a fairly wide range of diameters. A clip portion extends from the body and is capable of securably receiving an object, such as a length of cord or a flagpole grommet.

BRIEF DESCRIPTION OF THE DRAWING

Reference is now made to the attached drawing, when read in combination with the following specification, in which like reference numerals refer to like part throughout the several views, and in which:

FIG. 1 is a perspective view of the clip-type fastening device according to a first preferred embodiment of the present invention;

FIG. 2 is a view similar to that shown in FIG. 1 and illustrates the deformable and resilient nature of the clip portion and the first and second aperture defining and clamping means of the body according to the present invention;

FIG. 3 is a view of the clip-type fastening device according to the first preferred embodiment in which the clamping means fixedly secures the body about a tubular member and a flagpole grommet is secured within the clip portion;

FIG. 4 is an enlarged view in section of a part of the deformable aperture defining portions and the interengaging clamping members;

FIG. 5 is a clip-type fastening device with alternately configured clamping means and clip portion according to a second preferred embodiment of the present invention;

FIG. 6 is a clip-type fastening device with an alternately configured clip portion according to a third preferred embodiment of the present invention;

FIG. 7 is a side view in section of the clip portion shown in FIG. 6;

DETAILED DESCRIPTION OF THE PREFERRED EMBODIMENTS

Figure 8:
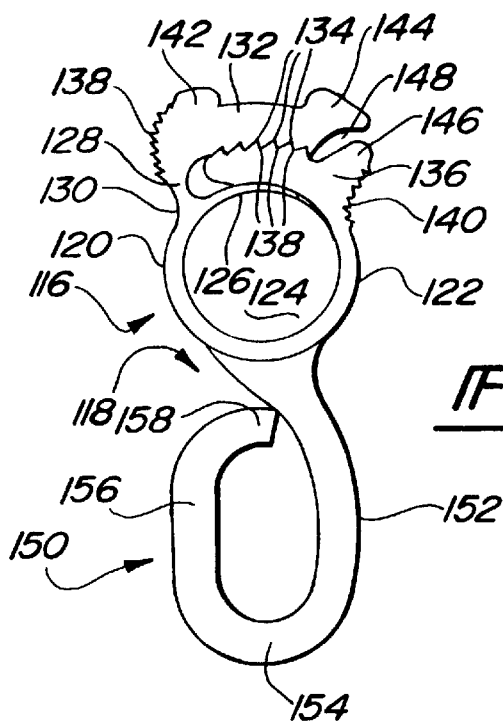
FIG. 8 is a clip-type fastening device with an alternatively configured clamping means and clip portion according to a fourth preferred embodiment of the present invention.

Referring now to FIGS. 1–3, a clip-type fastening device 10 is shown according to a first preferred embodiment of the present invention. The fastening device 10 according to the present invention is preferably constructed of a deformable and resilient extruded material such as a polymer or heavy duty nylon. It is conceivable however that the fastening device could be constructed of other materials which exhibit the necessary properties of elasticity and resiliency.

Referring again to FIGS. 1 and 2, the fastening device 10 includes a body 11 having a first deformable aperture defining portion 12 and a second deformable aperture defining portion 14 which, in combination, create a curved aperture 16 within the body. The curved aperture 16 can be of any desired shape, but it is preferably substantially circular.

Referring again to FIGS. 1 and 2, and also to FIGS. 3 and 4, the first deformable aperture defining portion 12 includes a terminal and arcuate shaped aperture extending portion 18 and a first connecting portion 20 extending from a base 22 of the aperture extending portion 18. A first engaging member 24 extends from the first connecting portion 20 in a spaced apart and overlapping manner with respect to the aperture extending portion 18 and includes a first plurality of inwardly facing serrated teeth 26 along an inner edge of the first engaging member 24.

A second engaging member 28 is provided and extends from the second aperture defining portion 14 and inserts between the arcuate shaped aperture extending portion 18 of the first deformable portion 12 and the first engaging member 24. A second plurality of outwardly facing serrated teeth 30 are formed along an outer edge of the second engaging member 28 and interengage with the first plurality of serrated teeth 26 to clamp the first and second engaging members 24, 28 in a step-lock fashion. A second connecting portion 32 extends from a base 22a of the second engaging member 28 and terminates in a deformable outer flap portion 34. The outer flap portion 34 extends from the connecting portion 32 in an outwardly spaced and overlapping manner with respect to the first engaging member 24 and abuts against a corresponding outer surface 36 of the first engaging member 24.

In use, the first and second engaging members 24, 28 are applied over a fixed member 42 (FIG. 3) to be secured in an elastic and twisting fashion and the rows of serrated teeth 26 and 30 are then engaged in a step-like fashion to an extent necessary so that the diameter of the aperture 16 equals the diameter of the fixed member 42 to securely clamp the fastening device 10 around the fixed member 42. To release the device 10 from around the fixed member 42, the outer flap portion 34 is deformed about a flex hinge 38 (see FIG. 4) concurrent with twisting the first and second deformable portions 12, 34 in opposite directions to dislocate the second engaging member 28 from the first engaging member 24 as shown by the direction of the arrows 40 (FIG. 2). As is further best seen from FIG. 1, the sides of the body 10 are curved inwardly as shown at 33a to form depressions on opposite side of the body 11 for easier gripping and handling.

The device 10 may therefore be disassembled from a first clamped position shown in FIG. 3 in which the device 10 is secured around the fixed tubular member 42 to an open position as shown in FIG. 2. The formation of the plurality of serrated portions 26, 30 on the engaging members 24, 28 in combination with the deformable and resilient nature of the aperture defining portions 12, 14 enables the clip-type fastening device 10 to effectively engage and clamp to a fairly wide range of members having different diameters and configurations. As is further best shown in FIG. 4, the first connecting portion 20 preferably terminates in a projecting edge 44 which projects a distance beyond the first engaging member 24 and which is spaced a distance 46 from a corresponding edge 47 of the outer flap portion 34. The spacing of the outer flap portion 34 from the projecting edge 44 permits the user to grasp the edge 47 of the outer flap portion 34 while still providing a generally smooth outer contour to the fastening device 10.

An elastic clip portion 48 is provided and according to the first preferred embodiment, forms a substantially U-shaped member 49 which extends from the body of the fastening device at a first position 50, forms a substantial loop-shape 51, and reconnects to the body 11 at a second position 52. As is best seen in FIG. 2, a terminal end of the U-shaped member 49 forms a substantially T-shape 54 and may be twistingly engaged in a direction shown by arrow 56 to insert within a correspondingly shaped T-slot 53 in the body 11. Referring again to FIG. 3, an item such as a flag grommet 60 may be held within the U-shaped clip member 49 and a plurality of identically configured fastening devices 10 may be clamped to a flag pole 42 at spaced intervals to function as a support for a flag mounted to the flag pole 42.

Referring now to FIG. 5, a clip-type fastening device 62 is shown according to a second preferred embodiment of the present invention. The deformable aperture defining portions and clamping means according to the second preferred embodiment are similar to that shown in the first preferred embodiment and include a terminal aperture extending portion 64 which forms a part of the first aperture defining portion 65 and a connecting portion 66 which terminates in a first engaging member 68. The engaging member 68 extends in an outwardly spaced and overlapping fashion relative to the aperture extending portion 64 and includes a first plurality of inwardly facing and serrated teeth 70. A second engaging member 72 extends from the second aperture defining portion and includes a second plurality of outwardly facing and serrated teeth 74 which engage in a step-lock fashion with the first plurality of teeth 70 to clamp the fastening device 62 about the fixed tubular member 42.

The fastening device 62 according to the second preferred embodiment also preferably includes a release tab 76 which extends from the first engaging member 68 and which forms a substantially terminal and angular shaped portion. The release tab 76 is capable of being grasped and deflected in an outward direction to a position 78 shown in phantom in order to disengage and separate the first and second engaging members 68, 72 from one another. A gripping portion 82 extends from the second engaging member 72 and is contoured so that an inner surface 84 of the gripping portion forms a slight interference fit against a corresponding terminating edge 86 of the first engaging member 68. The interference fit protects against unintended or accidental release of the inter-engaging means.

A clip portion 88 according to the second preferred embodiment is shown and is preferably constructed of a flat member 90 which extends from a body 91 of the device 62. Formed in the member 90 at spaced intervals are a plurality of spaced apertures 92 which are sized in diameter to receive lengths of cord 94 of varying diameters. The clip portion 88 according to the second preferred embodiment is specifically suited for use as a marine-type clip for securing lengths of cord having ¼" or ⅜" diameters to which are attached objects such as boat fenders (not shown) which suspend over the side of a marine craft and which prevent unwanted contact between a hull of the craft and an associated marine dock.

Referring to FIGS. 6 and 7, a clip-type fastening device 96 is shown according to a third preferred embodiment of the present invention. The clamping means shown in the fastening device 96 are substantially identical with those shown in the second preferred embodiment with the exception that a first plurality of knurled edges 98 may be formed on an outer surface of a gripping member 100 and a second plurality of knurled edges 102 may likewise be placed on an outer surface of a release tab 104. The purpose of the knurled edges 98, 102 is to facilitate the user in the assembly and removal of the clamping means.

A clip portion 106 extends from an aperture forming portion 105 of a body 111 opposite the deformable portions and engaging means and includes a contoured base 108, an arc shaped midsection 110 and a terminating edge 117 which in combination forms a substantially hook shaped engaging portion. One or more cords or lines 114 may be fitted into an aperture 115 defined within the hook enclosure, depending upon the dimensions of the hook, and are securely held in place.

Referring to FIG. 8, a clip-type fastening device 116 according to a fourth preferred embodiment is shown and includes a body 118 having a deformable aperture defining portion 120 and a deformable aperture defining portion 122 which, in combination, define an aperture 124. As is shown in the earlier preferred embodiments, a terminal and arcuate shaped aperture extending portion 126 and a first connecting portion 128 extend from a base 130 of the aperture defining portion 120. A first engaging member 132 extends from the first connecting portion 128 in a spaced apart and overlapping manner with respect to the aperture extending portion 126 and includes a first plurality of inwardly facing serrated teeth 134 along an inner edge of the first engaging member 132.

A second engaging member 136 is provided and extends from the second aperture defining portion 122 and inserts between the arcuate shaped aperture extending portion 126 of the first deformable portion 120 and the first engaging member 132. A second plurality of outwardly facing serrated teeth 138 are formed along an outer edge of the second engaging member 136 and inter-engage with the first plurality of serrated teeth 134 to clamp the first and second engaging members 132 and 136 in a step-lock fashion. The clip-type fastening device 116 also includes a first plurality of knurled edges 138 formed on an outer surface of the engaging member 132 and a second plurality of knurled edges 140 formed on an outer surface of the engaging member 136. As with the previous embodiments, the purpose of the knurled edges is to facilitate the application of the clamp assembly by assisting the user in applying a better grip.

Referring again to FIG. 8, additional clamping leverage is provided to the fastening device 116 by a first projecting grip portion 142 which is formed atop the first engaging member 132 at a first end thereof. The grip portion 142 is formed in proximity to an upper edge of the first plurality of knurled edges 138 and is shaped so as to prevent the user's thumb or fingers (not shown) from slipping across the top of the engaging member 132 during the clamping stage.

A contoured release portion 144 is formed atop the first engaging member 132 at a second end thereof. A second projecting grip portion 146 extends from the second engaging portion 136 in such a fashion as to be spaced proximate to and a close distance 148 apart from the release portion 144. In use, the release portion 144 is grasped between the user's finger and thumb and is either twisted upwardly or to the side to disengage the engaging member 132 from the engaging member 136 to thereby disengage the fastening device 116.

A clip portion 150 extends from the body 118 in a direction opposite the first and second engaging portions 132 and 136. The clip portion 150 has a shape somewhat similar to that shown in the embodiment of FIG. 6 and includes a contoured base 152, an arc shaped midsection 154 and a portion 156 terminating in an abutting fashion against the contoured base 152. In contrast to the edge 117 according to the embodiment of FIG. 6, a terminating edge 158 is pointed inwardly towards the body 118 to more securably fasten an object (not shown) therein.

Figure 9:
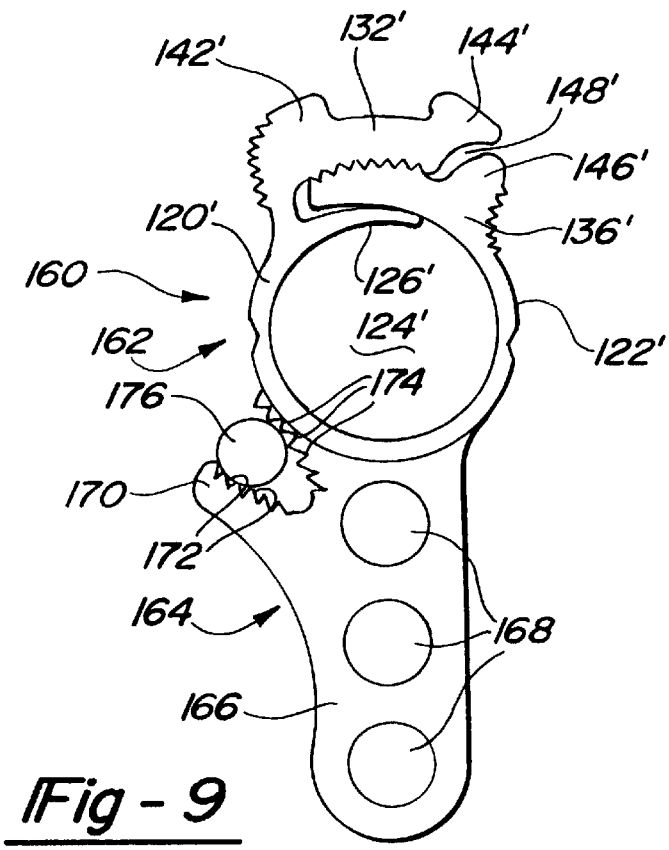
FIG. 9 is a clip-type fastening device with an alternatively configured clip portion according to a fifth preferred embodiment of the present invention.

Finally, referring to FIG. 9, a clip-type fastening device 160 is shown according to a fifth preferred embodiment. The device 160 incorporates the identical clamping structure as shown in the embodiment according to FIG. 8 and includes a first aperture defining portion 120' and a second aperture defining portion 122' which combine to create a curved aperture 124' within a body 162 of the fastening device 160. An arcuate shaped aperture extending portion 126' and a first engaging member 132' extends from the first aperture defining portion 120' and sandwiches therebetween a second engaging member 136'. A first gripping portion 142' and a second gripping portion 146' are provided on the gripping members 132' and 136' for assisting in the clamping of the device 160 and a release portion 144' facilitates the detachment of the device from the object being secured.

A clip portion 164 according to the fifth preferred embodiment is shown and is similar in respects to the clip portion 88 shown in the second preferred embodiment. The clip portion 164 includes a flattened body member 166 having a plurality of spaced apertures 168 for receiving lengths of cord or other objects (not shown). A jaw portion 170 extends upwardly and outwardly from the body 166 in an opposing fashion relative the aperture defining portions 120' and 122'. A first plurality of teeth 172 are formed along an inner surface of the jaw portion 170 and a second plurality of teeth 174 are formed along an opposing edge of the connection between the aperture defining portion 120' and the body member 166. An additional cord member 176, such as a trailing end of a line, may be conveniently secured within the jaw portion 170.

It is apparent that I have described a clamping device capable of many uses for securely clamping one object to another. The serrated teeth provide a secure means for locking an object to the clamping device and yet means are provided to permit the clamping means to be readily disengaged from the object when it is desired to do so.

Having described several preferred embodiments of my invention, additional embodiments will become apparent to those skilled in the art to which it pertains without deviating from the scope of the appended claims.

I claim:

What is claimed is:

1. A clip-type fastening device adapted to secure a fixed member to a secured object, said fastening device comprising:

a deformable and resilient body;

an aperture defined within said body;

means for deformably manipulating extending in one direction from said body and so that the fixed member is adapted to be received within said aperture and means for clamping the body around the fixed member;

an extending portion to which the secured object is adapted to be engaged, said extending portion forming a substantially hook-shaped member and extending from said body in another direction opposite said means for deformably manipulating;

said clamping means including a first engaging inner member and a second engaging member, said members outer engaging one another in a clamping position and serration means for retaining said engaging members in a clamping position; and said outer engaging member having an outwardly extending release tab for pulling said outer engaging member away from said inner engaging member, thereby said fastening device is adapted to be removed from the fixed member.

2. The clip-type fastening device as described in claim 1, said means for manipulating further comprising a first deformable aperture defining portion and a second deformable aperture defining portion.

3. The clip-type fastening device as described in claim 2, said means for clamping further comprising said first engaging member extending from said first deformable portion and said second engaging member extending from said second deformable portion.

4. The clip-type fastening device as described in claim 2, said first deformable portion including a terminal and arcuate shaped aperture extending portion and a first connecting portion extending from said aperture extending portion, said first engaging member extending from said first connecting portion in a spaced apart and overlapping manner with respect to said aperture extending portion and having an inner surface, said retaining means comprising a first plurality of serrations being formed along said inner surface of said first engaging member.

5. The clip-type fastening device as described in claim 4, said second engaging member extending from said second aperture defining portion and having an outer surface adjacent said inner surface of said first engaging member, said retaining means further comprising a second plurality of serrations being formed along said outer surface of said second engaging member which engage with said first plurality of serrations to clamp said second engaging member in a step-lock fashion relative to said first engaging member.

6. The clip-type fastening device as described in claim 5, further comprising a second connecting portion extending from said second engaging member which terminates in a deformable outer flap portion, said outer flap portion extending from said second connecting portion in a spaced apart and overlapping manner with respect to said first engaging member, said outer flap portion abutting against a corresponding outer surface of said first engaging member and being deformable about a hinge to dislocate said second engaging member from said first engaging member.

7. The clip-type fastening device as described in claim 5, further comprising a release tab portion extending from said first engaging member, said release tab capable of being grasped and engaged in an outwardly deflected direction to separate said first engaging member from said second engaging member.

8. The clip-type fastening device as described in claim 7, further comprising a gripping portion extending from said second engaging member, a first plurality of knurled edges being formed upon an outer surface of said gripping portion and a second plurality of knurled edges being formed upon a corresponding outer surface of said release tab portion.

9. The clip-type fastening device as described in claim 8, further comprising an interference fit formed between an inner surface of said gripping portion and a terminating edge of said first engaging member.

10. The clip-type fastening device as described in claim 1, further comprising a flag grommet being secured within a substantially U-shaped member.

11. The clip-type fastening device as described in claim 1, further comprising depressions formed on opposite sides of said body for assisting in clamping said body around the fixed member.

\* \* \* \* \*